United States Patent [19]

Vorih

[11] Patent Number: 5,340,381
[45] Date of Patent: Aug. 23, 1994

[54] OPERATING SYSTEM FOR DUAL-SIEVE OXYGEN CONCENTRATORS

[76] Inventor: Marc L. Vorih, 5635 Heads Creek Rd., House Springs, Mo. 63051

[21] Appl. No.: 62,238

[22] Filed: May 17, 1993

[51] Int. Cl.⁵ .......................................... B01D 53/04
[52] U.S. Cl. ........................................ 95/21; 95/105; 95/130; 96/114; 96/130; 96/133
[58] Field of Search ............... 95/19, 21, 22, 98, 100, 95/101, 103, 105, 130; 96/113, 114, 130, 133, 144

[56] References Cited

U.S. PATENT DOCUMENTS

| | | | |
|---|---|---|---|
| 3,182,435 | 5/1965 | Axt | 96/114 |
| 3,659,399 | 5/1972 | Kauer, Jr. et al. | 95/19 |
| 3,880,616 | 4/1975 | Myers et al. | 95/130 X |
| 4,065,272 | 12/1977 | Armond | 95/101 |
| 4,168,149 | 9/1979 | Armond et al. | 95/21 |
| 4,222,750 | 9/1980 | Gauthier et al. | 95/130 X |
| 4,349,357 | 9/1982 | Russell | 95/130 X |
| 4,378,982 | 4/1983 | McCombs | 96/130 X |
| 4,404,005 | 9/1983 | Hamlin et al. | 96/130 X |
| 4,449,990 | 5/1984 | Tedford, Jr. | 55/26 |
| 4,477,264 | 10/1984 | Kratz et al. | 95/103 |
| 4,545,790 | 10/1985 | Miller et al. | 55/161 |
| 4,561,287 | 12/1985 | Rowland | 73/23 |
| 4,643,743 | 2/1987 | Grader | 95/130 X |
| 4,687,573 | 8/1987 | Miller et al. | 96/130 X |
| 4,698,075 | 10/1987 | Dechene | 96/130 X |
| 4,732,587 | 3/1988 | Koch | 96/114 |
| 4,822,384 | 4/1989 | Kato et al. | 96/113 X |
| 4,830,641 | 5/1989 | White, Jr. et al. | 96/130 |
| 4,857,086 | 8/1989 | Kawai | 55/162 |
| 5,002,591 | 3/1991 | Stanford | 55/26 |
| 5,042,994 | 8/1991 | Smolarek | 55/18 |
| 5,114,441 | 5/1992 | Kanner et al. | 95/98 |
| 5,122,164 | 6/1992 | Hirooka et al. | 95/98 X |
| 5,183,483 | 2/1993 | Servido et al. | 95/98 |
| 5,223,004 | 6/1993 | Etéve et al. | 95/98 |

OTHER PUBLICATIONS

Oxycon; Service and Repair Manual; Oxycon, Inc.; Cover and Flow Sheet of FIG. 3, p. 8, (not dated).

*Primary Examiner*—Robert Spitzer
*Attorney, Agent, or Firm*—Jerome A. Gross

[57] ABSTRACT

An operating system for dual-sieve oxygen concentrators, as used by invalids, provides a method and apparatus for controlling the purging and release of product gas and the cycling period in response to the pressure build-up in each sieve column. The cycling period is thereby self-adjusting to changes in the capacity of the columns. Restricting flow of product gas and purge gas to the higher-pressure part of the adsorption period provides product gas of higher purity and reduces the loss of oxygen in the purge.

21 Claims, 2 Drawing Sheets

5,340,381

OPERATING SYSTEM FOR DUAL-SIEVE OXYGEN CONCENTRATORS

BACKGROUND OF THE INVENTION

The present invention relates to dual-sieve oxygen concentrators normally used by invalids at their home or in nursing home or hospital care; its principal purposes are to achieve more efficient utilization of the sieves and longer freedom from operating problems.

Portable dual-sieve oxygen concentrators have largely replaced compressed gas cylinders in the supply of oxygen to invalids at their homes. Such concentrators preferentially adsorb nitrogen from air pumped under pressure during an adsorption period into one column containing a bed of molecular sieve particles. The oxygen, with other non-adsorbed components, passes into a product reservoir from which it is dispensed to the user. When the sieve material in the first column becomes saturated with nitrogen, the feed air is switched to the second column where the adsorption is repeated. Upon switching, the first column is vented to the atmosphere, and adsorbed nitrogen flows out of the sieve material and may be swept from the bed by an addition of oxygen-enriched gas during a purge period. After purging, the first column is ready for a subsequent adsorption period.

The length of time for cycling the columns is usually set so that switching occurs just before the adsorbing column becomes saturated with nitrogen. Since adsorbents commonly become fouled over long use, cycle time is initially set conservatively (shorter than necessary), as is the peak pressure of the adsorption period (lower than optimum). Commonly, cycle time is controlled by a timer; is the same for each column; and does not change as sieve capacity decreases. This results in sub-optimum efficiency over the life of the columns since, initially, the adsorption capacity of the sieves is not fully utilized, and finally, unchanging cycle time allows nitrogen break-through as sieve capacity decreases.

Prior dual-sieve concentrators have attempted to increase efficiency by varying the cycle period in response to product use rate (U.S. Pat. Nos. 4,561,287, 5,042,994) and purity (U.S. Pat. No. 4,857,086). Some concentrators also use timers to control purge (U.S. Pat. Nos. 4,449,990, 4,545,790) and product release (U.S. Pat. No. 5,002,591). However, no prior dual-sieve oxygen concentrator known to applicant independently varies the cycling period of each sieve column and, therefore, loses efficiency when the adsorption capacity of one sieve differs from the other. Nor does any prior oxygen concentrator known to applicant provide purge and product release coordinated with a variable cycling period.

SUMMARY OF THE INVENTION

An object of the present invention is to provide an apparatus and process for independently varying the cycling period in response to pressure build-up for each sieve column.

Another object is to coordinate a pressure-responsive cycling period with pressure-responsive purge and product release.

Another object is to utilize pressure-responsive product release to achieve high oxygen purity under conditions of high demand and, if desired, in coordination with pressure-responsive cycling and purge.

Further objects are to provide for ease of matching sieve columns during manufacture of the dual-sieve concentrators and to provide for easy detection of fouled or mismatched columns during maintenance or service.

In a preferred embodiment of the present invention pressure-responsive mechanical-pneumatic valves are used with check valves and orifices to control cycling period, purging and product release. A method of using the present invention includes pumping air to one column; sensing pressure in the column; while continuing to pump air to the column, releasing oxygen-enriched gas to purge at one pre-set pressure and to the product reservoir at the same or a different pre-set pressure; at a higher pre-set pressure, switching the feed air to the second column while venting the first column to the atmosphere; and repeating the steps for the second column.

DESCRIPTION OF THE PREFERRED EMBODIMENTS

Figure 1:
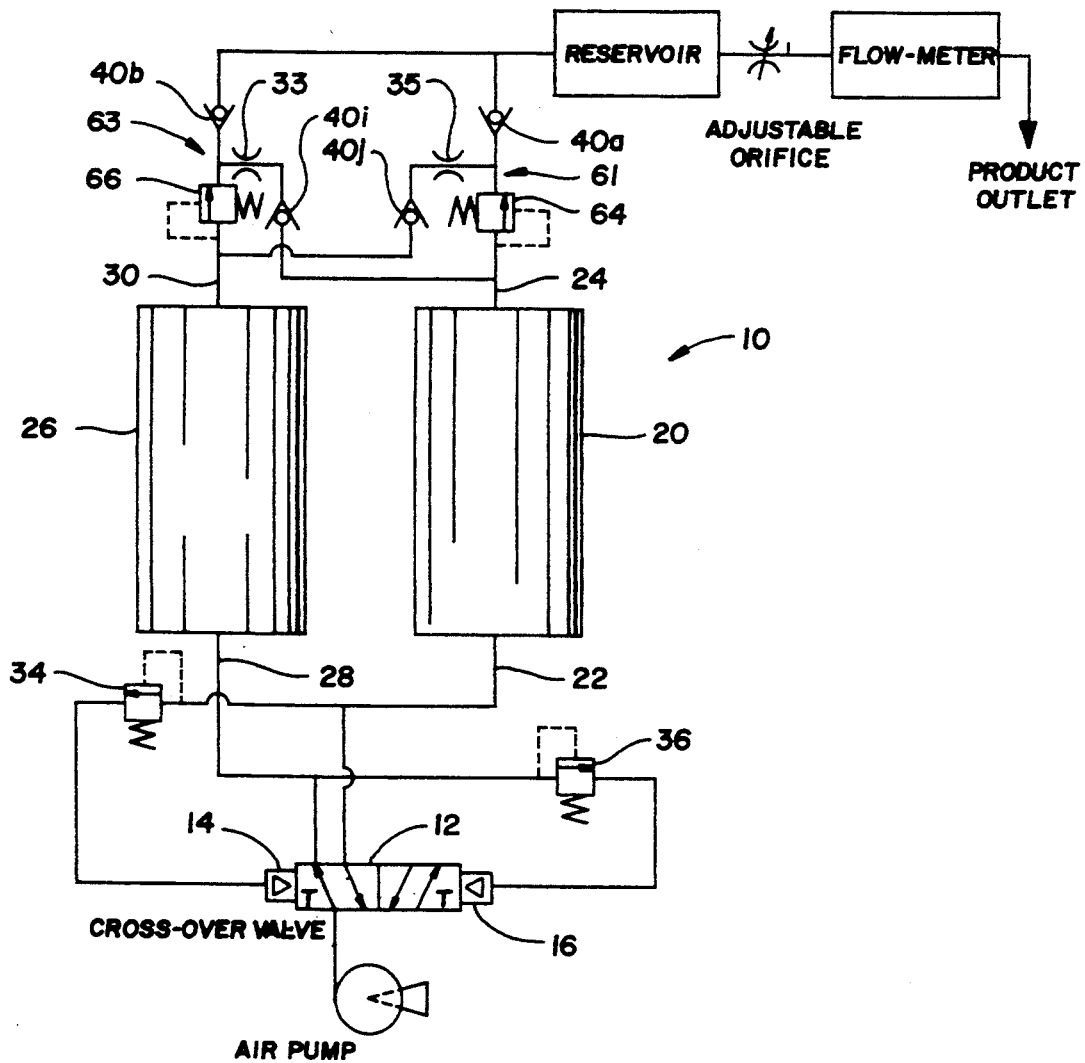
FIG. 1 shows a block diagram of a dual-sieve oxygen concentrator incorporating the present invention.

Referring to FIG. 1, the dual-sieve oxygen concentrator of the present invention, generally designated 10, comprises a first sieve column 20 and a second sieve column 26. Each column is filled with a bed of zeolite molecular sieve particles of pore size and adsorption characteristics for preferential adsorption of nitrogen. The concentrator also includes an air pump, a two-position cross-over valve 12 which interconnects the air pump with the two sieve columns 20, 26, a product reservoir and flow-controlling devices for delivering oxygen-enriched gas to a user.

The first column 20 has an inlet 22, for receiving air from the air pump, and an outlet 24 for delivering oxygen-enriched gas to a first product/purge conduit means 61. The first product/purge conduit means 61 comprises a first product/purge valve 64, preferably a mechanical-pneumatic pre-set pressure relief valve having a manually adjustable pressure relief range of 0–30 psig; a check valve 40a, to prevent reverse flow of gas from the reservoir to the first column 20; an orifice 35; and a second check valve 40j, to prevent reverse flow from the second column outlet 30 to the first column 20, connected by gas conduit as shown in FIG. 1 to deliver oxygen-enriched gas from the outlet 24 of the first column 20 partially to the outlet 30 of the second column 26, with the balance delivered to the reservoir.

The second column 26 likewise has an inlet 28 and an outlet 30. The outlet 30 of the second column connects with a second product/purge conduit means 63 which comprises a second product/purge valve 66, preferably of the same type as the first product/purge valve 64; a check valve 40b; an orifice 33; and another check valve 40i connected as shown in FIG. 1 (similar to the first product/purge conduit means 61, but to deliver oxygen-enriched gas from the outlet 30 of the second column 26 partially to the reservoir as well as to the outlet 24 of the first column 20). The size of the orifices 33, 35 is selected such that flow from the first and second column outlets 24, 30 is split between the purge to the other column and delivery to the reservoir in such a proportion to optimize the amount and purity of product delivered to the reservoir. Orifice size selection is dependent upon the flow characteristics of other components in the product/purge conduit flow path and may be done by any dual-sieve concentrator technician of ordinary skill.

The terms "column inlet" and "column outlet", as herein used, include those portions of the column and conduits connected thereto at which the pressure is substantially the same as would be measured respectively at the inlet or outlet connection to the column.

A five-port, two-position, double air pilot cross-over valve 12 with five flow ports and two air-signal ports 14, 16, interconnects the first and second column inlets 22, 28 with the air pump as shown in FIG. 1. Alternatively, a four-port, two position, double air pilot valve (not shown) could be used as the cross-over valve 12. The cross-over valve 12 provides that while the first column inlet 22 is connected with the air pump, the second column inlet 28 is vented to the atmosphere. When the position of the cross-over valve 12 is switched, the air pump is connected to the second column inlet 28 and the first column inlet 22 is vented. (the position shown in FIG. 1).

Switching of the cross-over valve 12 is controlled by a first cycle valve 34 and a second cycle valve 36, preferably mechanical-pneumatic valves like the product/purge valves 64, 66. The first cycle valve 34 interconnects the first column inlet 22 with a first air-signal pilot port 14 of the cross-over valve 12, while the second cycle valve 36 interconnects the second column inlet 28 with the second air-signal pilot port 16. Connection of the cycle valves 34, 36 is such that an air signal, released through the first cycle valve 34 when the pressure in the first column inlet 22 exceeds the pre-set relief pressure setting of the first cycle valve 34, shifts the cross-over valve 12 to the position where air is directed to the second column 26.

Referring again to FIG. 1, in the preferred method of operation of the present invention, air is pumped to the first column 20 during an adsorption period, while the second column 26 is in a purge period. When air first enters the first column 20, the first product/purge valve 64 is not yet open, allowing pressure to build up while nitrogen is adsorbed. When pressure, sensed near the first column outlet 24, builds up to a first pre-set level (between 10–20 psig and preferably about 18 psig), the first product/purge valve 64 opens to release oxygen-enriched gas through the product/purge conduit means 61, partly to the second column 26 and partly to the reservoir. Such release continues at a rate which permits pressure build-up to continue until a second pre-set level (between 18–25 psig and preferably about 20–22 psig) is reached. At that point, the air feed is switched from the first column inlet 22 to the second column inlet 28, thus ending the adsorption period for the first column 20 and starting its purge period.

At the beginning of the purge period of the first column 20, and before purging gas is fed to it, nitrogen, previously adsorbed, is released and flows out of the column thus venting its pressure out of the first column inlet 22 and the cross-over valve 12 to the atmosphere. In the latter part of the purge period, after pressure has been thus largely reduced, oxygen-enriched gas from the second column 26 is introduced into the first column outlet 24 to purge remaining nitrogen and to fill the first column 20 prior to its next adsorption period. This same series of steps is then repeated for the second column 26.

Figure 2:
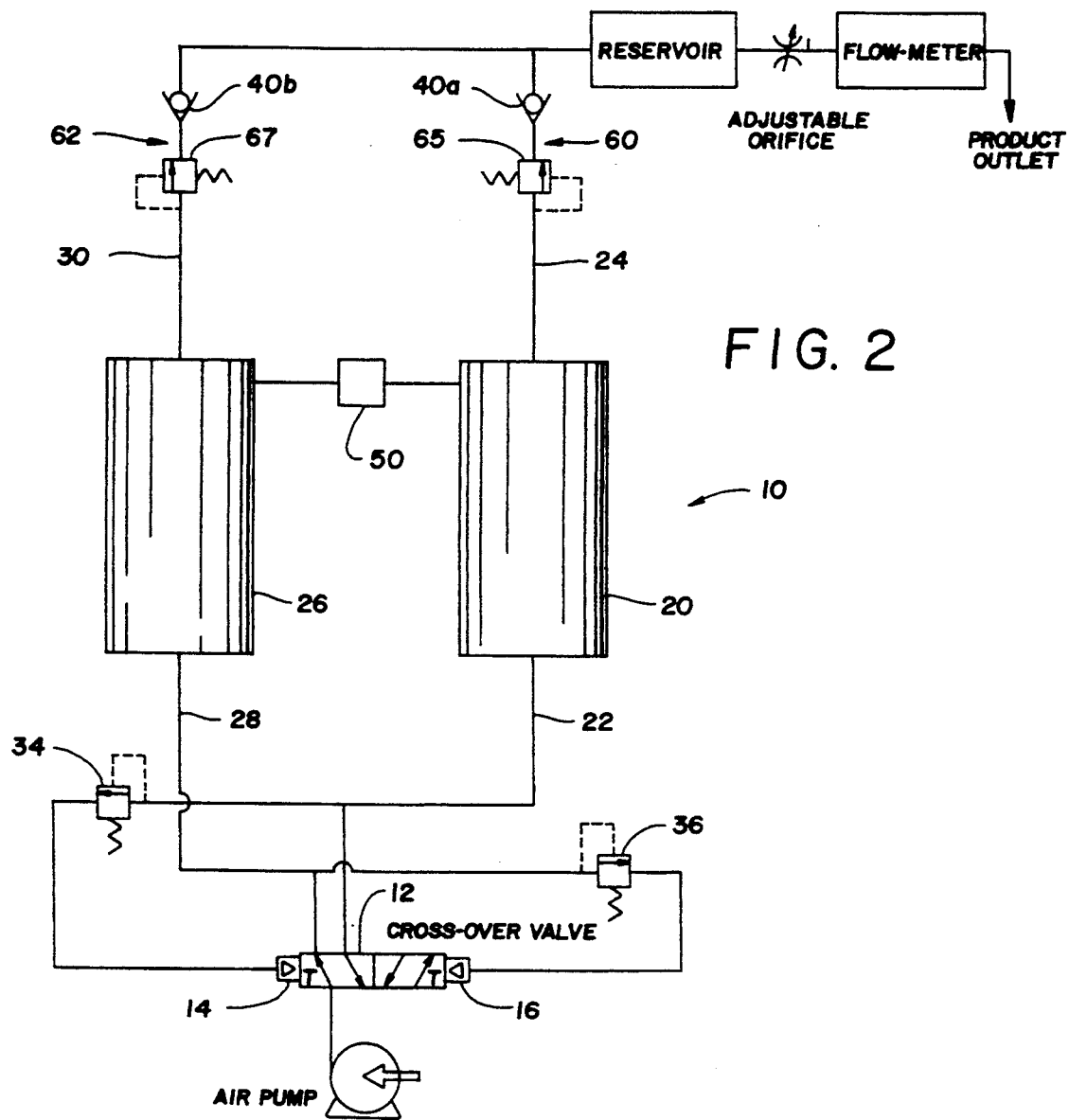
FIG. 2 shows a block diagram of a dual-sieve oxygen concentrator incorporating an alternate of the present invention.

An alternate embodiment of the device of the present invention, shown in FIG. 2, provides separate purge and product delivery conduits. Instead of the first and second product/purge conduits 61, 63 of the device of FIG. 1, the first and second columns 20, 26 each have product gas conduit means 60, 62 and share a reversible-flow purge gas conduit means 50. Each product gas conduit means 60, 62 respectively comprises a check valve 40a, 40b and a pre-set pressure relief product release valve 65, 67 interconnecting the respective column outlets 24, 30 with the reservoir. Such product release valves 65, 67 are preferably pre-set pressure relief valves of the same type as the product/purge valves 64, 66 of FIG. 1, and serve to prevent the release of oxygen-enriched gas from the columns 20, 26 until the pre-set relief pressure is exceeded in their respective columns 20, 26.

Figure 3:
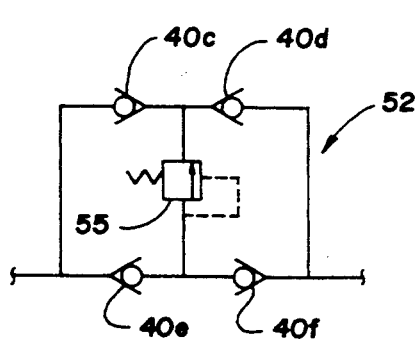
FIG. 3 shows a block diagram of a reversible flow purge gas conduit means of the present invention for interconnecting two columns and transferring oxygen-enriched gas from the outlet of one column to the outlet of the other column.

The reversible-flow purge gas conduit means 50 may simply be an orifice interconnected between the column outlets by gas conduit. However, in the FIG. 3 embodiment of the present invention the purge gas conduit means 50 comprises a single valve purge gas conduit means 52, which includes a single pre-set pressure relief purge valve 55 and four check valves (40c, 40d, 40e, 40f), connected as shown in FIG. 3. This embodiment permits no flow of purge gas until the pressure in the column in adsorption mode reaches the pre-set pressure of the single pressure relief purge valve 55. When that pressure is reached, the single valve purge gas conduit means 52 permits the flow of gas from the column in adsorption mode to the column in purge mode.

Referring to FIG. 2, an alternative method of practicing the present invention involves the same steps of feeding and switching the columns as discussed above, but replaces the single step of product release and purge transfer with separate steps. In this embodiment, air is fed to the first column 20 until a first pre-set pressure (between 10–18 psig and preferably about 14–18 psig) is reached. Then, either the first product release valve 65 opens to release oxygen-enriched gas to the reservoir, or the reversible-flow purge gas conduit means 50 permits gas to flow into the second column 26 for the purpose of purging nitrogen therefrom. The rate of this gas release is such to permit pressure build-up to continue as pumping continues. At some second pre-set pressure higher than the first (between 11–20 psig and preferably about 18–20 psig), whichever of the first product release valve 65, or the reversible-flow purge gas conduit means 50 as did not open at the first pre-set pressure, now opens to allow respective flow of oxygen-enriched gas. (Unless, however, the reversible-flow purge gas conduit means 50 is simply an orifice, in which case it remains open at all times.) These releases then continue until a higher pre-set pressure is reached, at which time the cross-over valve 12 is switched.

Figure 4:
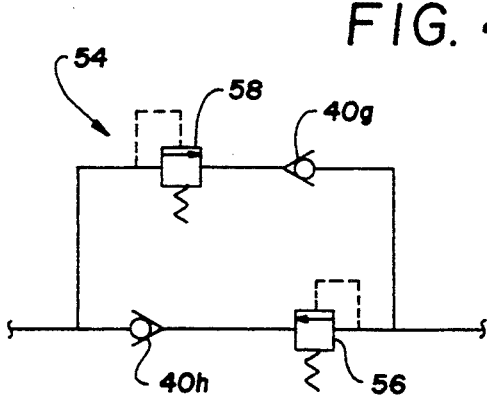
FIG. 4 shows a block diagram of an alternate reversible flow purge gas conduit means.

Another embodiment of the present invention utilizes dual-valve purge gas conduit means 54, as shown in FIG. 4 which comprises a first pre-set pressure relief purge valve 56 and a second pre-set pressure relief purge valve 58 connected into a flow path with two check valves 40g, 40h. The dual-valve purge gas conduit means 54 interconnects the first and second adsorption columns 20, 26 at, or near, their respective outlets 24, 30. The use of two pressure relief valves permits the pressure at which purge is initiated to be set independently for each adsorption column.

Referring to FIGS. 3 and 4, two alternatives are given for the preferred method of action for the purge gas conduit 50 means. In either embodiment, when pressure in the adsorbing column reaches a pre-set level, transfer of purge gas from the adsorbing column to the purging column is commenced and continues until the feed air is switched to the other column. However, a single purge valve conduit means 52 releases purge gas at the same pre-set pressure for either column (between 12–20 psig and preferably 14–18 psig), while the dual purge valve conduit means 54 permits pressures for purge initiation to be pre-set independently for each column (preferable range is the same as for the single purge valve).

An advantage of using the pressure-responsive cycle valves 34, 36 at the inlet of each column is that the cycle time of each column is made responsive to the pressure build-up in that column. Likewise, use of the pressure-responsive product/purge valves 64, 66, or the product release valves 64, 66 and the purge gas conduit means 50 provides that the purge and product release from each column are responsive to the pressure build-up of the respective column and may be set at the same or at different pressures, but less than the pressure used for switching the cycle. Thus, cycle time, purge and product release are made responsive to the pressure build-up in each column. Further advantages are the elimination of the use of electrical solenoid valves resulting in a device which is simple and inexpensive to build and maintain, and is reliable in service.

The advantage of a cycling process responsive to pressure in each column is believed to be that each sieve column is used more efficiently. Since other physical properties of the system do not change, the most significant change in the volume available to air fed into a column is believed to be the pore volume of the adsorbent available to nitrogen. If this volume is reduced by fouling, relatively less nitrogen adsorption volume is available and the pressure in the column will build-up at a faster rate. Saturation will also occur in a shorter time. Where, as here shown, the cycle is controlled by pressure build-up rather than by time, switching will occur at increasingly shorter times for each column as its capacity to adsorb nitrogen decreases, but such reduction of cycle time for the individual column will prevent the breakthrough of nitrogen into the reservoir and preserve the quality of the product gas. In this manner, the preferred embodiment is self-adjusting to differences between, or to changes in the adsorption capacity of, the two columns.

An advantage of having the cycle time for each sieve column vary according to the condition of those columns is that columns may easily be matched during the assembly of dual-sieve column concentrators according to cycle time without the use of expensive instruments. In assembling a dual-sieve column concentrator having a pressure-responsive switching system one could set the cycle valves at the same pressure and install two columns for testing. The concentrator could then be operated and the cycle time observed for each column. The cycle times of columns are then compared and two columns having similar cycle times may be selected for use in the same unit. Likewise, servicemen doing maintenance on a unit can rapidly ascertain and remedy mismatching or differential fouling of sieves by comparing their cycle times and replacing any column for which the cycle time is substantially less than it was when the column was new.

Another advantage is that less oxygen-enriched gas is lost to the purge when the purge is pressure-initiated near the end of the adsorption/purge cycle. With the purge gas introduced only at relatively high pressure, the amount of nitrogen introduced into the column being purged is reduced, and with lower concentration of nitrogen at the beginning of its adsorption mode, the higher will be the effectiveness of the separation process. Delaying the purge also allows the purging process to begin simply by exhaustion of the pressure which had built-up in that column during its adsorption mode, before the purge is completed by transfer of high-quality purge gas.

Aspects of the present invention may be used alone as well as in concert with other aspects. For example, should it be desired to use a conventional timed-cycle oxygen concentrator, the introduction, into the column outflow conduits, of mechanical-pneumatic pre-set pressure relief valves similar to valves 34, 36 of FIGS. 1 and 2 has been found to maintain oxygen purity at near theoretical maximum as the outflow rate from the product reservoir is increased to or beyond rated capacity; preliminary test results indicate that the percentage of betterment may amount to 2% to 3%. Use of such product release valves in timed-cycle concentrators also seems to be increasingly effective in increasing product gas oxygen level as the ambient temperature increases.

As various other modifications may be made in the devices and methods herein described without departing from the scope of the invention, it is intended that all matter contained in the foregoing description shall be taken as illustrative rather than limiting.

What I claim is:

1. In that type of oxygen concentrator having a product reservoir and first and second columns for adsorbing nitrogen, the process comprising the steps of:
   (a) pumping air into the inlet of such first column while restricting outflow therefrom until a first pre-set pressure is reached;
   (b) then, while continuing pumping, releasing the unadsorbed gas, partly to such product reservoir and partly to the outlet of such second column, at such rate that build-up of pressure continues in such first column until a second pre-set pressure is reached;
   (c) then, switching the pumping of air from the inlet of such first column to the inlet of such second column and opening the inlet of such first column, whereby to vent the nitrogen theretofore collected therein; and
   (d) repeating as to such second column the steps set forth in (a) to (c) above,
   whereby to avoid releasing gas from such first column until such gas has been retained in such first column under at least said first pressure pre-set for release.

2. The process of claim 1 wherein,
   said second pre-set pressure of step (b) is about 2–10 psig greater than said first pre-set pressure of step (a).

3. In that type of oxygen concentrator having a product reservoir and a column for adsorbing nitrogen, the process comprising the steps of:
   (a) pumping air into the inlet of such column while restricting outflow therefrom until a first pre-set pressure is reached;
   (b) then, while continuing pumping, releasing the unadsorbed gas to such product reservoir at such rate that build-up of pressure continues in such column until a second pre-set pressure is reached; and
   (c) then, ceasing the pumping of air to such column and opening the inlet of such column to a lower pressure
   whereby to vent the nitrogen theretofore collected therein.

4. In that type of oxygen concentrator having a product reservoir and first and second columns for adsorbing nitrogen, the process comprising the steps of:
   (a) pumping air into the inlet of such first column, while releasing unadsorbed gas therefrom to such reservoir at such rate that pressure continues to build up in such first column, until a pre-set pressure is reached;
   (b) then, switching the pumping of air from the inlet of such first column to the inlet of such second column and opening the inlet of such first column, whereby to vent the nitrogen theretofore collected therein; and
   (c) repeating as to such second column the steps set forth in ( a ) to ( b ) above,
   whereby to avoid switching the pumping of air from such first column to such second column until the pressure in such first column builds up to said pre-set pressure.

5. The process of claim 4 with an additional step inserted between steps (a) and (b) thereof, the additional step comprising:
   then, while continuing pumping, transferring at least part of the unadsorbed gas from the outlet of such first column to the outlet of such second column at such rate that pressure continues to build up in such first column until a second pre-set pressure is reached.

6. In that type of oxygen concentrator having a product reservoir and first and second columns for adsorbing nitrogen, the process comprising the steps of:
   (a) pumping air into the inlet of such first column, while releasing unadsorbed gas to such reservoir at such rate that pressure continues to build up in such first column, until a pre-set pressure is reached;
   (b) then, transferring at least part of the unadsorbed gas from the outlet of such first column to the outlet of such second column whereby to purge the nitrogen remaining in such second column;
   (c) switching the pumping of air from the inlet of such first column to the inlet of such second column and opening the inlet of such first column, whereby to vent the nitrogen collected therein; and
   (d) repeating as to such second column the steps set forth in (a) to (c) above,
   whereby to avoid transferring gas from such first column to such second column for the purpose of purging such second column of nitrogen until such gas has been retained in such first column under at least said pre-set pressure.

7. In that type of oxygen concentrator having a product reservoir and first and second columns for adsorbing nitrogen, the process comprising the steps of:
   (a) pumping air into the inlet of such first column while restricting outflow therefrom until a pre-set pressure is reached;
   (b) then, while continuing pumping, releasing the unadsorbed gas from such first column to such reservoir;
   (c) then, switching the pumping of air from the inlet of such first column to the inlet of such second column and opening the inlet of such first column, whereby to vent the nitrogen theretofore collected therein; and
   (d) repeating as to such second column the steps set forth in (a) to (c) above,
   whereby to avoid releasing gas to such reservoir until such gas has been retained in one of such columns under at least said pressure as pre-set for release.

8. The process of claim 7 with an additional step inserted between steps (b) and (c) thereof, such additional step comprising:
   then, continuing pumping and releasing gas to such reservoir at such a rate that pressure continues to build-up in such first column until a greater pre-set pressure is reached.

9. The process of claim 7 with an additional step inserted between steps (b) and (c) thereof, the additional step comprising:
   continuing pumping until a greater pre-set pressure is reached, then transferring at least part of such unadsorbed gas from the outlet of such first column to the outlet of such second column for the purpose of purging such second column of nitrogen adsorbed therein.

10. In the assembly of a dual-sieve column oxygen concentrator, the process of using a pressure-responsive cycle switching system, including a pre-set pressure relief cycle valve for each column of such concentrator, the process of matching two sieve columns to be utilized in such assembly which comprises the steps:
    (a) setting such pressure relief cycle valves at the same pressure;
    (b) preliminarily installing two such sieve columns;
    (c) operating such oxygen concentrator, and
    (d) in the event their cycle times do not substantially correspond, changing at least one of said sieve columns and repeating step (c) above, and comparing the cycle times of such first and second columns for which such pre-set pressure for switching is the same; and
    (e) selecting such first and second columns by matching those having substantially the same cycle time.

11. For use in maintenance service of an oxygen concentrator of the type having a nitrogen-adsorbing sieve column and a pressure-responsive cycle system responsive to pressure build-up in the column, the process of ascertaining and remedying a deficiency in nitrogen adsorbing capacity of such sieve column which comprises the steps:
    (a) comparing the switch time of such column with that of an unused column; and
    (b) replacing any such column which demonstrates a cycle time substantially less than that demonstrated by such unused column.

12. In an oxygen concentrator having an air pump; a first and a second nitrogen adsorption column, each such column having an inlet end into which air is received from such air pump and an outlet end for delivering gas of reduced nitrogen content to a product reservoir; and a cross-over valve to shift the supply of air from such pump to such columns alternately and on each alternation to exhaust nitrogen-rich gas from that column from which the air supply has been so shifted;

the invention comprising:
a first cycle valve having a pre-set pressure limit and being connected between the inlet end of such first column and such cross-over valve, whereby to shift in response to build-up of air pressure at the inlet end of such first column;
a second cycle valve having a pre-set pressure limit and being connected between the inlet end of such second column and such cross-over valve, whereby to shift in response to build-up of air pressure at the inlet end of such second column;
a first product/purge conduit means interconnecting the outlet of such first column to such product reservoir and to the outlet of such second column; and
a second product/purge conduit means interconnecting the outlet of such second column to such product reservoir and to the outlet of such first column,
whereby the release from one of such columns of oxygen-enriched gas to such product reservoir and to such other column, as well as the switching of the supply of air from one such column to the other, respond independently to the pressure in each such column.

13. The oxygen concentrator of claim 12 wherein, said first and second cycle valves comprise
pre-set mechanical pneumatic pressure relief valves of the type having a manually adjustable pre-set minimum pressure at which the valve opens.

14. The oxygen concentrator of claim 12 wherein, said first and second product/purge conduit means each comprise
a product/purge valve between the outlet of each such column and a flow-splitting tee connector;
a check valve in one flow path from said flow-splitting tee connector between said connector and such product reservoir; and
an orifice and a check valve in the other flow path from said flow-splitting tee connector between said connector and the outlet of such other column,
whereby oxygen-enriched gas may be transferred from the outlet of each such column partly to the outlet of such other column with the remainder being delivered to such product reservoir.

15. In an oxygen concentrator having an air pump; a first and a second nitrogen adsorption column, each such column having an inlet end into which air is received from such air pump and an outlet end for delivering oxygen-enriched gas to a reservoir; check valves to prevent reverse flow from the reservoir to the columns; and a cross-over valve to shift the air received from such pump to such columns alternately and on each alternation to exhaust nitrogen-rich gas from that column from which the air supply has been so shifted;

the invention comprising:
a first cycle valve to operate such cross-over valve to shift responsive to build-up, to a pre-set limit thereof, of air pressure at the inlet end of the first such column;
a second cycle valve to operate such cross-over valve to shift responsive to build-up, to a pre-set limit thereof, of air pressure at the inlet end of the second such column,
whereby to utilize each such adsorption column and avoid shifting the air supply therefrom until pressure at the inlet end thereof builds up to said pre-set limit.

16. An oxygen concentrator as in claim 15 further comprising:
reversible flow purge gas conduit means, connecting the outlet ends of both such columns, by which oxygen-enriched gas is transferred from the outlet end of such column that is so receiving air to the outlet end of such other column whereby to purge nitrogen collected therein;
said reversible flow purge gas conduit means including both a pre-set pressure relief purge valve and a plurality of check valves so connected in a conduit path to permit flow when the pressure in the column which is receiving air from such air pump exceeds the pre-set pressure of such pressure relief purge valve; and
product gas conduit means for such delivery of oxygen-enriched gas from the outlet end of each such column to such reservoir; said product gas conduit means including
a pre-set pressure relief product release valve,
whereby such delivery is prevented until the pressure in said product gas conduit exceeds the pre-set pressure of said pressure relief product release valve.

17. In an oxygen concentrator having an air pump; a first and a second nitrogen adsorption column, each such column having an inlet end into which air is received from such air pump and an outlet end for delivering oxygen-enriched gas to a reservoir; check valves to prevent reverse flow from the reservoir to the columns; a cross-over valve to shift the air received from such air pump to such columns alternately and on each alternation to exhaust nitrogen-rich gas from that column from which the air supply has been so shifted; and control means to shift such cross-over valve, the invention comprising:
reversible flow purge gas conduit means, connecting the outlet ends of both such columns, by which oxygen-enriched gas is transferred from the outlet end of such column that is so receiving air to the outlet end of such other column whereby to purge nitrogen collected therein,
said reversible flow purge gas conduit means including both a pre-set pressure relief purge valve and a plurality of check valves so connected in a conduit path to permit flow when the pressure in the column which is receiving air from such air pump exceeds the pre-set pressure of such pressure relief purge valve,
whereby to effect purging of nitrogen-rich gas during that interval when oxygen-enriched gas is available at relatively high pressure.

18. In an oxygen concentrator having an air pump; a first and a second nitrogen adsorption column, each such column having an inlet end into which air is received from such air pump and an outlet end for the delivery of oxygen-enriched gas to a reservoir; check valves to prevent reverse flow of gas from such reservoir to such columns; a cross-over valve to shift the air from such air pump to such columns alternately and on each alternation to exhaust nitrogen-rich gas from that column from which the air has been so shifted; and control means to shift such cross-over valve;

the invention comprising:
a product gas conduit means connecting the outlet end of each such column to such reservoir; each said product gas conduit means including
a pre-set pressure relief product release valve so connected to prevent such delivery until the pressure at the column outlet end equals the pre-set pressure of said pressure relief product release valve,
whereby to limit such delivery to gas which has been contained in one of such columns at a pressure no less that said pre-set pressure of said product release valve.

19. An oxygen concentrator having an air pump:
a first and a second nitrogen adsorption column, each said column having an inlet end into which air is received from said air pump and an outlet end from which gas of reduced nitrogen content is delivered to a reservoir;
cross-over valve means to shift the supply of air from said pump to said columns alternately and on each alternation to exhaust nitrogen-rich gas from the inlet end of that column from which the air supply has been so shifted; and
means to operate said cross-over valve means whenever the pressure in the column receiving the supply of air reaches a pre-selected maximum column pressure.

20. An oxygen concentrator as defined in claim 19, further having
means to delay onset of delivery to the reservoir of oxygen-enriched gas from said outlet ends of each of said columns until a preselected onset-of-delivery pressure is reached, said onset-of-delivery pressure being less than such pre-selected maximum column pressure.

21. In an oxygen concentrator having an air pump, a first and second nitrogen adsorption column, each such column having an inlet end into which air is received from such air pump and an outlet end for delivering gas of reduced nitrogen content to a product reservoir, and cross-over valve means to shift the supply of air from such pump to such columns alternately and on each alternation to exhaust nitrogen-rich gas from that column from which the air supply has been so shifted; the invention comprising
means to delay the onset of delivery of oxygen-enriched gas from either of such columns to such product reservoir until that column attains a preselected onset-of-delivery pressure,
whereby to increase the oxygen content of the gas delivered to the reservoir.

* * * * *